United States Patent
Ikarashi (10) Patent No.: US 10,348,491 B2
(45) Date of Patent: Jul. 9, 2019

(54) SECRET SHARING METHOD, SECRET SHARING SYSTEM, DISTRIBUTING APPARATUS AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/569,187

(22) PCT Filed: May 11, 2016

(86) PCT No.: PCT/JP2016/063958
§ 371 (c)(1),
(2) Date: Oct. 25, 2017

(87) PCT Pub. No.: WO2016/181980
PCT Pub. Date: Nov. 17, 2016

(65) Prior Publication Data
US 2018/0123780 A1  May 3, 2018

(30) Foreign Application Priority Data
May 12, 2015 (JP) .................. 2015-097278

(51) Int. Cl.
*H04L 9/08* (2006.01)
*G09C 1/00* (2006.01)

(52) U.S. Cl.
CPC ............. *H04L 9/085* (2013.01); *G09C 1/00* (2013.01); *H04L 9/0869* (2013.01)

(58) Field of Classification Search
CPC ................................................ H04L 9/085
See application file for complete search history.

(56) References Cited

U.S. PATENT DOCUMENTS

2004/0236812 A1   11/2004   Stein et al.

OTHER PUBLICATIONS

Extended European Search Report dated Nov. 7, 2018 in Patent Application No. 16792705.2, 8 pages.
(Continued)

*Primary Examiner* — Simon P Kanaan
(74) *Attorney, Agent, or Firm* — Oblon, McClelland, Maier & Neustadt, L.L.P.

(57) ABSTRACT

Computational complexity is reduced in accordance with given k and n. A random number generation unit 12 generates random numbers $r_0$ to $r_{k-2} \in GF(x^q)$. A share generation unit 14 generates shares $b_0$ to $b_{n-1}$ by calculating a product of a vector $a=(r_0, \ldots, r_{k-2}, s)$, having the random numbers $r_0$ to $r_{k-2}$ and plaintext $s \in GF(x^q)$ as its elements, and a matrix A. A share selection unit 15 generates a vector $b'=(b_{p0}, \ldots, b_{pk-1})$ having, as its elements, k shares $b_{p0}$ to $b_{pk-1}$ selected from the shares $b_0$ to $b_{n-1}$. An inverse-matrix generation unit 16 generates an inverse matrix $A'^{-1}$ of a k-degree square matrix having the $p_0$-th to $p_{k-1}$-th rows of the matrix A. A plaintext calculation unit 17 restores the plaintext s by multiplying the k-th row of the inverse matrix $A'^{-1}$ and the vector b'.

7 Claims, 3 Drawing Sheets

(56) References Cited

OTHER PUBLICATIONS

Desmedt, Y. et al. "Revisiting the Karnin, Greene and Hellman Bounds" ICITS, XP019102289, 2008, pp. 183-198.
Westall, J. et al. "An Introduction to Galois Fields and Reed-Solomon Coding" School of Computing Clemson University, XP055519940, Oct. 4, 2010, pp. 1-16.
International Search Report dated Jun. 28, 2016 in PCT/JP2016/063958 filed May 11, 2016.
Adi Shamir, "How to Share a Secret", Communications of the ACM, Nov. 1979, vol. 22, No. 11, pp. 612-613.
Jun Kurihara et al., "On a Fast (k, n)-Threshold Secret Sharing Scheme", IEICE Transactions, Sep. 2008, vol. E91-A, No. 9, pp. 2365-2378.
Bernard Sklar, "Channel Coding: Part 3", Digital Communications: Foundations and Applications, 2006, Pearson Education, 37 total pages (with corresponding original English version).

SECRET SHARING METHOD, SECRET SHARING SYSTEM, DISTRIBUTING APPARATUS AND PROGRAM

TECHNICAL FIELD

The present invention relates to secret sharing techniques, and more specifically, to a technique that reduces the computational complexity of information-theoretic secret sharing.

BACKGROUND ART

The conventional information-theoretic secret sharing includes, for example, Shamir's secret sharing, as described in Non-Patent Literature 1, and XOR-based secret sharing, as described in Non-Patent Literature 2.

Shamir's secret sharing and XOR-based secret sharing are types of (k,n)-secret sharing. The (k,n)-secret sharing divides input plaintext into n shares, gives the n shares to n parties and has the parties hold them, allows the plaintext to be restored when k arbitrary shares are combined, but does not allow any information about the plaintext to be obtained with fewer than k shares, where n and k are integers equal to or larger than 2 and satisfy n≥2k−1.

PRIOR ART LITERATURE

Non-Patent Literature

Non-Patent Literature 1: A. Shamir, "How to share a secret", Communications of the ACM, vol. 22 (11), pp. 612-613, 1979.

Non-Patent Literature 2: J. Kurihara, S. Kiyomoto, K. Fukushima, and T. Tanaka, "On a Fast (k,n)-Threshold Secret Sharing Scheme", IEICE Transactions, vol. 91-A(9), pp. 2365-2378, 2008.

SUMMARY OF THE INVENTION

Problems to be Solved by the Invention

A problem with Shamir's secret sharing described in Non-Patent Literature 1 is the large computational complexity. More specifically, Shamir's secret sharing requires (k−1)n field multiplications. XOR-based secret sharing described in Non-Patent Literature 2 has such a lack of parameter flexibility that it has a limitation on applicable k and n values. Since the k and n values are directly linked to the level of security and data capacity, flexible applicability is preferable.

In view of these points, an object of the present invention is to provide a secret sharing technique that can be applied to given k and n values and that can reduce the computational complexity more than ever before.

Means to Solve the Problems

To solve the problems described above, the present invention provides a secret sharing method in which x is an element X of an irreducible polynomial f[X] that generates an extension field GF($x^q$), n and k are integers equal to or larger than 2 and satisfy n≥2k−1, $p_0$ to $p_{k-1}$ are different integers equal to or larger than 0 and smaller than n, and A is an n−by−k matrix defined by a formula given below:

$$A_{ij} = \begin{cases} 1 & \text{if } i = j \text{ and } i < k-1 \\ 0 & \text{if } i \neq j \text{ and } i < k-1 \\ x^{(i-k-1)j} & \text{if } i \geq k-1 \end{cases}$$

where i ∈ {0, ..., n−1}, j ∈ {0, ..., k−1}.

The secret sharing method includes a random number generation step in which a distributing apparatus generates random numbers $r_0, \ldots, r_{k-2} \in GF(x^q)$; a share generation step in which the distributing apparatus generates shares $b_0$ to $b_{n-1}$ by calculating a product of a vector $a = (r_0, \ldots, r_{k-2}, s)$, having the random numbers $r_0$ to $r_{k-2}$ and plaintext $s \in GF(x^q)$ as its elements, and the matrix A; a share selection step in which a restoring apparatus generates vector $b' = (b_{p0}, \ldots, b_{pk-1})$ having, as its elements, k shares $b_{p0}, \ldots, b_{pk-1}$ selected from the shares $b_0$ to $b_{n-1}$; an inverse-matrix generation step in which the restoring apparatus generates an inverse matrix $A'^{-1}$ of a k−degree square matrix having the $p_0$-th to $p_{k-1}$-th rows of the matrix A; and a plaintext calculation step in which the restoring apparatus restores the plaintext s by multiplying the k-th row of the inverse matrix $A'^{-1}$ and the vector b'.

EFFECTS OF THE INVENTION

The secret sharing technique of the present invention can be applied to given k and n values and has a lower computational complexity than ever before.

DETAILED DESCRIPTION OF THE EMBODIMENTS

The principle of the present invention will be described prior to describing embodiments.

The description given below supposes that x is an element X of an extension field GF($2^{64}$) over which the irreducible polynomial is $$f[X] = X^{64} + X^4 + X^3 + X^2 + X + 1$$

If x is an integer representation, it is 2.

GF($2^{64}$) is a set of remainders obtained by dividing a polynomial by a 64−degree polynomial f(x) of which the coefficients are integers mod 2 (polynomial division). It is a field and four basic arithmetic operations can be performed therein. It can also be considered as a 64−degree vector of bits where special arithmetic operations are possible. GF($2^{64}$) can be expressed as a 64-bit integer, where term $x^i$ is expressed as $2^i$. For example, $1 + x + x^3$ can be expressed as $2^0 + 2^1 + 2^3 = 11$.

The secret sharing of the present invention is configured by applying Reed-Solomon Codes, which are error-correcting codes. The Reed-Solomon Code is described in the following Reference Literature 1, for example.

Reference Literature 1: Bernard Sklar, "Digital Communications: Fondations and Applications," Pearson Education, 2006

The error-correcting-code encoding process can be expressed by formula (1) as a process of obtaining an output vector b by multiplying an input vector a of plaintext by a linear transformation (that is, a matrix) A. That is, the i-th row of the matrix A represents the coefficient to be multiplied to each element of the input vector a to generate the i-th element $b_i$ of the output vector b.

$$b = Aa \quad (1)$$

The error-correcting code decoding process can also be viewed as a linear transformation. It can be expressed by formula (2), where A' and b' are a matrix and a vector including only rows corresponding to k elements to be actually used among the matrix A and the vector b.

$$b' = A'a \quad (2)$$

Therefore, if there exists an inverse matrix of the matrix A, decoding expressed by formula (3) is possible.

$$a = A'^{-1} b' \quad (3)$$

In the error-correcting-code encoding, let the input vector a be a k-degree vector expressed by formula (4), where k is an integer equal to or larger than 2.

$$a = \begin{pmatrix} a_0 \\ \vdots \\ a_{k-1} \end{pmatrix} \quad (4)$$

Let the output vector b be an n-degree vector expressed by formula (5), where n is an integer equal to or larger than 2 and satisfies n ≥ 2 k−1.

$$b = \begin{pmatrix} b_0 \\ \vdots \\ b_{n-1} \end{pmatrix} \quad (5)$$

The matrix A is a matrix obtained by concatenating a k-by-k unit matrix expressed by formula (6) and an m-by-k Vandermonde matrix vertically, where m=n−k. The Vandermonde matrix is a specially configured matrix having the terms of a geometric progression as the elements of a row or a column in the same order.

$$A_{ij} = \begin{cases} 1 & \text{if } i = j \\ 0 & \text{if } i \neq j \text{ and } i < k \\ x^{(i-k)j} & \text{if } i \geq k \end{cases} \quad (6)$$

where $$i \in \{0, \ldots, n-1\}, j \in \{0, \ldots, k-1\}$$

That is, the matrix A is an n-by-k matrix as expressed by formula (7).

$$\underbrace{\left. \begin{pmatrix} 1 & 0 & 0 & \ldots & 0 \\ 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 0 \\ \hline 1 & 1 & 1 & \ldots & 1 \\ 1 & x & x^2 & \ldots & x^{k-1} \\ 1 & x^2 & x^4 & \ldots & x^{2(k-1)} \\ \vdots & \vdots & \vdots & \ddots & \vdots \\ 1 & x^{m-1} & x^{2(m-1)} & \ldots & x^{(m-1)(k-1)} \end{pmatrix} \right\} \begin{matrix} k \text{ rows} \\ \\ m \text{ rows} \end{matrix}}_{k \text{ columns}} \quad (7)$$

Since a part up to the k-th row of the matrix A is a unit matrix, elements $b_0$ to $b_{k-1}$ up to the k-th row of the output vector b agree with elements $a_0$ to $a_{k-1}$ of the input vector a. An element of the output vector b that agrees with an element of the input vector a is referred to as a data share, and the other elements are referred to as parity shares.

The secret sharing technique of the present invention is information-theoretic secret sharing configured by applying the error-correcting codes mentioned above. More specifically, information-theoretic secret sharing can be configured as follows: First, like the error-correcting codes, information-theoretic secret sharing is taken as a linear transformation using a matrix A. In the distribution process of the information-theoretic secret sharing of the present invention, an input vector a is a k-degree vector expressed by formula (8), where $r_0$ to $r_{k-2}$ are random numbers and s is plaintext. In other words, the elements of the input vector a up to the (k−1)-th row are random numbers and the element in the k-th row is plaintext.

$$a = \begin{pmatrix} r_0 \\ \vdots \\ r_{k-2} \\ s \end{pmatrix} \quad (8)$$

An output vector b is an n-degree vector expressed by formula (9), like that in the error-correcting code encoding.

$$b = \begin{pmatrix} b_0 \\ \vdots \\ b_{n-1} \end{pmatrix} \quad (9)$$

Since the part up to the k-th row of the matrix A of the error-correcting code is a unit matrix, multiplying it by the input vector a of the information-theoretic secret sharing turns the element in the k-th row of the output vector b into $b_{k-1} = s$. In secret sharing, using the plaintext directly as a share is prohibited for the purpose of confidentiality. Accordingly, the matrix A of the information-theoretic secret sharing differs from that of the error-correcting code as indicated by formula (10): The part up to the (k−1)-th row is a unit matrix, and the subsequent part from the k-th row is a Vandermonde matrix.

$$A_{ij} = \begin{cases} 1 & \text{if } i = j \text{ and } i < k - 1 \\ 0 & \text{if } i \neq j \text{ and } i < k - 1 \\ x^{(i-k-1)j} & \text{if } i \geq k - 1 \end{cases} \quad (10)$$

where $$i \in \{0, \ldots, n-1\}, j \in \{0, \ldots, k-1\}$$

That is, the matrix A is an n-by-k matrix as expressed by formula (11).

$$\underbrace{\begin{pmatrix} 1 & 0 & 0 & \ldots & 0 & 0 \\ 0 & 1 & 0 & \ldots & 0 & 0 \\ 0 & 0 & 1 & \ldots & 0 & 0 \\ \vdots & \vdots & \vdots & \ddots & \vdots & \vdots \\ 0 & 0 & 0 & \ldots & 1 & 0 \\ \hline 1 & 1 & 1 & \ldots & 1 & 1 \\ 1 & x & x^2 & \ldots & x^{k-2} & x^{k-1} \\ 1 & x^2 & x^4 & \ldots & x^{2(k-2)} & x^{2(k-1)} \\ \vdots & \vdots & \vdots & & \vdots & \vdots \\ 1 & x^m & x^{2m} & \ldots & x^{m(k-2)} & x^{m(k-1)} \end{pmatrix}}_{k \text{ columns}} \begin{matrix} \left.\vphantom{\begin{matrix}1\\1\\1\\1\\1\end{matrix}}\right\} (k-1) \text{ rows} \\ \\ \left.\vphantom{\begin{matrix}1\\1\\1\\1\\1\end{matrix}}\right\} (m+1) \text{ rows} \end{matrix} \quad (11)$$

The restoration process of the information-theoretic secret sharing of the present invention needs to restore just the plaintext s set as the element in the k-th row among the elements of the input vector a, and it can be restored just by a single k-dimensional linear combination. The plaintext s can be obtained by generating a matrix A' by extracting rows corresponding to k shares $b'_0$ to $b'_{k-1}$ to be used for restoration, and then by obtaining the inner product of the k-th row of the inverse matrix $A'^{-1}$ of the matrix A' and a vector having k shares $b'_0$ to $b'_{k-1}$.

Embodiments of the present invention will be described below in detail. Components having identical functions will be denoted by the same reference characters in the figures, and duplication of description will be avoided.

First Embodiment

Figure 1:
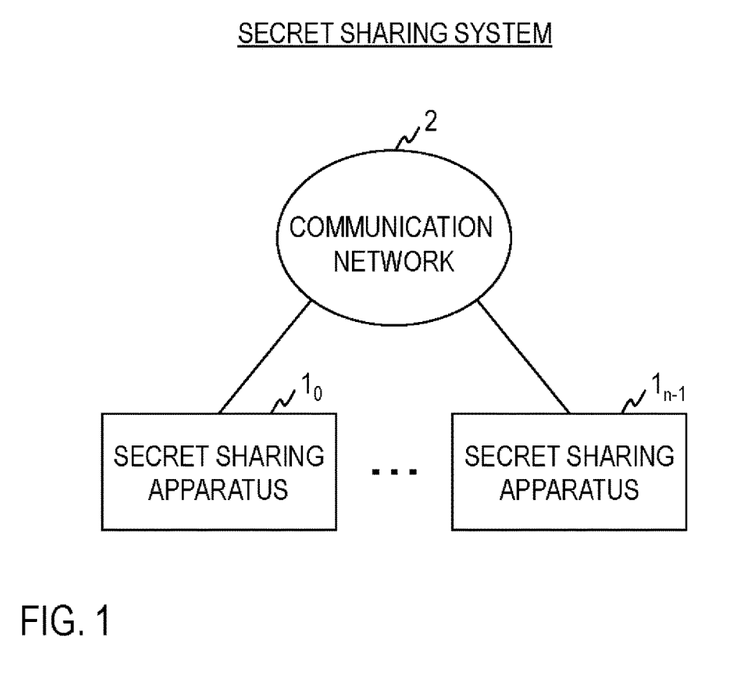
FIG. 1 is a diagram showing an example of the functional configuration of a secret sharing system.

A secret sharing system according to a first embodiment includes n($\geq$3) secret sharing apparatuses $1_0$ to $1_{n-1}$, as shown in FIG. 1. In this embodiment, the secret sharing apparatuses $1_0$ to $1_{n-1}$ are connected separately to a communication network 2. The communication network 2 is a circuit-switching or packet-switching communication network configured to allow mutual communication between the connected apparatuses, and the Internet, a local area network (LAN), a wide area network (WAN) or the like can be used, for example. Each apparatus does not necessarily have to be able to perform communication online via the communication network 2. For example, information to be input to the secret sharing apparatus $1_i$ (i$\in$\{0, \ldots, n-1\}) may be stored on a portable recording medium, such as a magnetic tape or a USB memory, and may be input offline from the portable recording medium.

Figure 2:
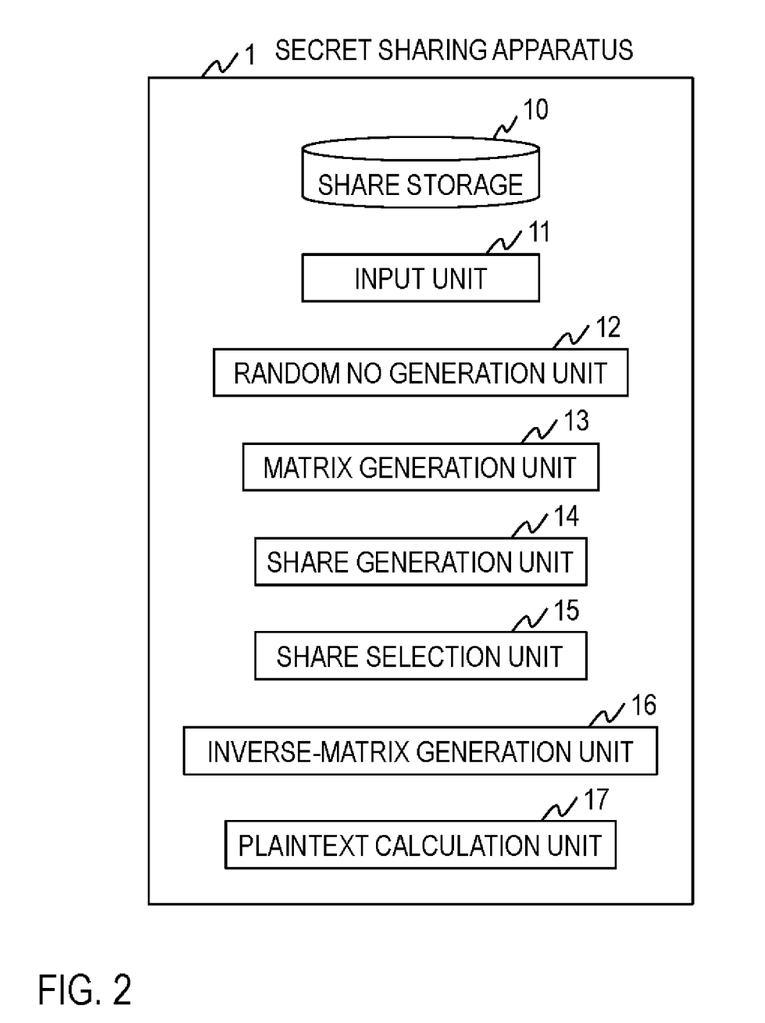
FIG. 2 is a diagram showing an example of the functional configuration of a secret sharing apparatus.

The secret sharing apparatus 1 includes a share storage 10, an input unit 11, a random number generation unit 12, a matrix generation unit 13, a share generation unit 14, a share selection unit 15, an inverse-matrix generation unit 16, and a plaintext calculation unit 17, as exemplified in FIG. 2. A secret sharing method of the first embodiment is implemented when this secret sharing apparatus 1 executes the processes of steps exemplified in FIG. 3.

The secret sharing apparatus 1 is, for example, a special apparatus configured by reading a special program into a known or special computer having a central processing unit (CPU), a main memory (a random access memory: RAM), and other components. The secret sharing apparatus 1 executes processing under the control of the central processing unit, for example. Data input to the secret sharing apparatus 1 or data obtained by processing is stored in the main memory, for example, and the data stored in the main memory is read into the central processing unit and used for other processing when necessary. At least some of the processing sections of the secret sharing apparatus 1 may be configured by hardware such as an integrated circuit.

The share storage 10 included in the secret sharing apparatus 1 can be configured by a main memory such as a RAM (random access memory), an auxiliary memory configured by a hard disk, an optical disc, or a semiconductor memory element such as a flash memory, or middleware such as a relational database or a key-value store.

Figure 3:
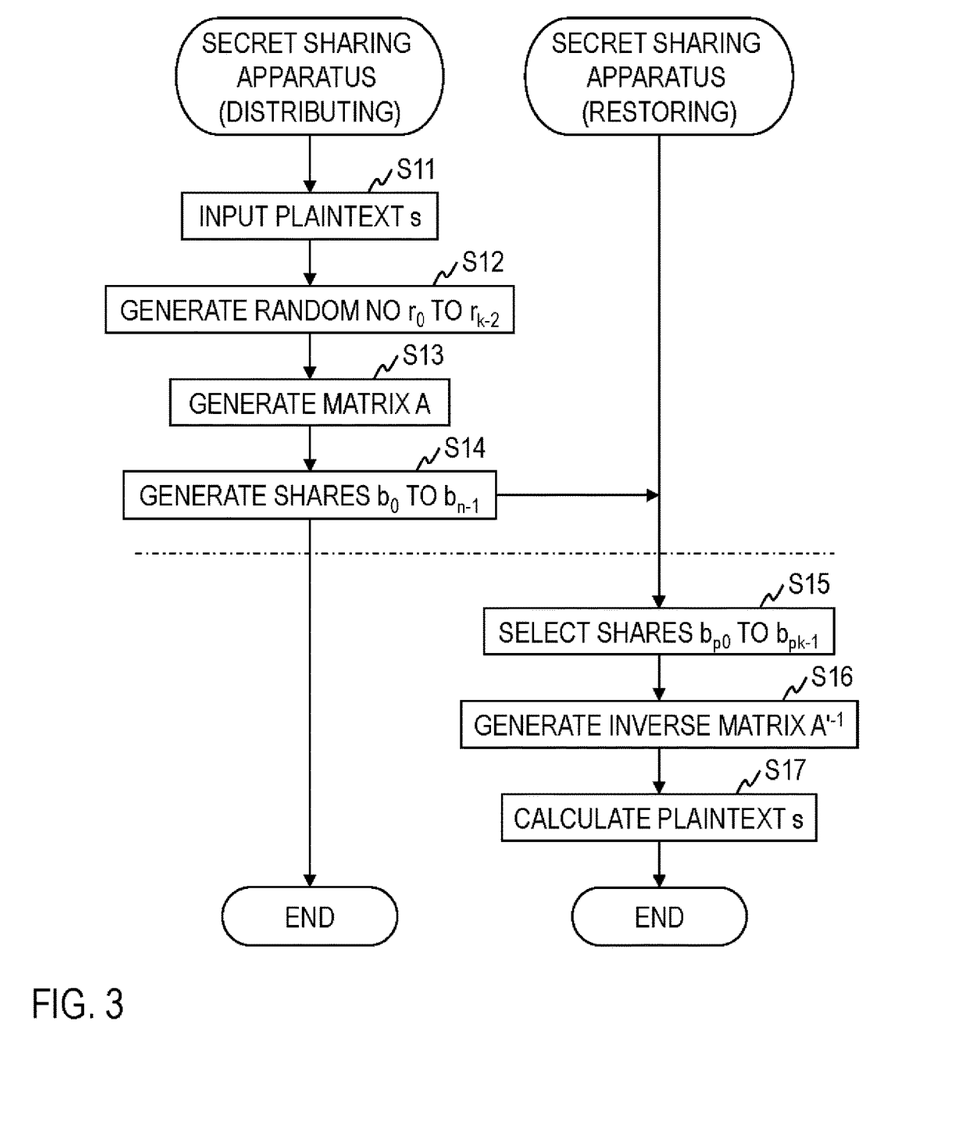
FIG. 3 is a diagram showing an example of a processing flow of a secret sharing method.

The processing procedure of the secret sharing method in the first embodiment will be described with reference to FIG. 3.

The secret sharing method is divided into a distribution process and a restoration process. The distribution process and restoration process are executed by any single secret sharing apparatus $1_i$ (i$\in$\{0, \ldots, n-1\}) selected from the n secret sharing apparatuses $1_0$ to $1_{n-1}$. The secret sharing apparatus that executes the distribution process can be the same as or can be different from the secret sharing apparatus that executes the restoration process. In the subsequent description, the secret sharing apparatus that performs the distribution process will be referred to as a distributing apparatus, and the secret sharing apparatus that performs the restoration process will be referred to as a restoring apparatus.

In step S11, plaintext s$\in$GF($x^q$) is input to the input unit 11 of the distributing apparatus. Plaintext s is sent to the share generation unit 14.

In step S12, the random number generation unit 12 of the distributing apparatus generates k-1 random numbers $r_0, \ldots, r_{k-2} \in GF(x^q)$. The random numbers $r_0$ to $r_{k-2}$ are sent to the share generation unit 14. The random number generation unit 12 may generate at random k-1 random numbers $r_0$ to $r_{k-2}$ one by one by using a random number generator or may generate random numbers $r_0$ to $r_{k-2}$ by selecting k-1 values in accordance with a predetermined rule from a plurality of values generated and stored in the memory in advance.

In step S13, the matrix generation unit 13 of the distributing apparatus generates a n-by-k matrix A defined by formula (12). The matrix A is sent to the share generation unit 14. The matrix A may be generated in advance because it can be calculated if n and k are determined. In that case, the matrix generation unit 13 has only to read the matrix A generated and stored in advance.

$$A_{ij} = \begin{cases} 1 & \text{if } i = j \text{ and } i < k - 1 \\ 0 & \text{if } i \neq j \text{ and } i < k - 1 \\ x^{(i-k-1)j} & \text{if } i \geq k - 1 \end{cases} \quad (12)$$

where $$i \in \{0, \ldots, n-1\}, j \in \{0, \ldots, k-1\}$$

In step S14, the share generation unit 14 of the distributing apparatus generates a k-degree vector a=($r_0, \ldots, r_{k-2}$, s) and obtains an n-degree vector b=($b_0, \ldots b_{n-1}$) by calculating the product of the vector a and the matrix A. As the 0-th to (k−2)-th elements $b_0$ to $b_{k-2}$ of the vector b, the random numbers $r_0$ to $r_{k-2}$ are directly specified. As the remaining elements $b_{k-1}$ to $b_{n-1}$ of the vector b, values $c_0$ to $c_{m-1}$ obtained by calculating formula (13) for i=0 to m−1, where m=n−k, are specified individually.

$$c_i = \sum_{0 \leq j < k-1} r_j x^{ij} + s x^{i(k-1)} \tag{13}$$

The share generation unit 14 generates the elements of the vector b as n shares $b_0$ to $b_{n-1}$ and distributes and sends them respectively to the n secret sharing apparatuses $1_0$ to $1_{n-1}$. The secret sharing apparatus 1, receives the corresponding share $b_i$ and stores the received share $b_i$ in the share storage 10.

The distribution process ends here. The restoration process will be described next.

In step S15, the share selection unit 15 of the restoring apparatus obtains k given usable shares $b_{p0}$ to $b_{pk-1}$ and generates a k-degree vector $b'=(b_{p0}, \ldots, b_{pk-1})$, where $p_0$ to $p_{k-1}$ are numbers of shares to be used for restoration and are k different integers selected from integers equal to or larger than 0 and smaller than n. The vector b' is sent to the plaintext calculation unit 17, and $p_0$ to $p_{k-1}$ are sent to the inverse-matrix generation unit 16.

In step S16, the inverse-matrix generation unit 16 of the restoring apparatus generates a k-degree square matrix by pulling out the $p_0$-th to $p_{k-1}$-th rows of the matrix A and calculates its inverse matrix $A'^{-1}$. The inverse matrix $A'^{-1}$ is sent to the plaintext calculation unit 17.

In step S17, the plaintext calculation unit 17 of the restoring apparatus restores the plaintext s by multiplying the k-th row of the inverse matrix $A'^{-1}$ and the vector $b'=(b_{p0}, \ldots, b_{pk-1})$.

In Shamir's secret sharing, the number of multiplications in the distribution process is (k−1)n. In the secret sharing system of this embodiment, the number of multiplications in the distribution process is (k−1)(n−k+1). Therefore, according to the secret sharing system of this embodiment, the computational complexity of secret sharing can be reduced.

Second Embodiment

The multiplication of a and $b \in GF(2^{64})$ is an operation to multiply two 63-degree polynomials a and b (formula (14)) and then divide the result by a 64th-degree polynomial f (formula (15)). Here, the coefficient of the λ-degree term is given by formula (16).

$$a = \sum_{1 < 64} a_i x^i, \quad b = \sum_{1 < 64} b_i x^i \tag{14}$$

$$\sum_{i < 64} \sum_{j < 64} a_i b_j x^{i+j} \bmod f \tag{15}$$

$$\bigoplus_{i+j=\lambda} a_i b_j \tag{16}$$

In formula (15), the process of turning a 126-degree polynomial into a 63-degree polynomial by mod f is called reduction. Reduction is processed by using the equivalence relation of formula (17).

$$f = x^{64} + x^4 + x^3 + x + 1 = 0 \bmod f \tag{17}$$

Formula (17) can be modified to a relation that reduces a 64-degree term to a four-degree expression as indicated by formula (18).

$$x^{64} = x^4 + x^3 + x + 1 \bmod f \tag{18}$$

As given by (19), the degree of each term of degree 64 or higher can also be reduced by 60.

$$x^{64+n} = x^n (x^4 + x^3 + x + 1) \bmod f \tag{19}$$

A 126-degree polynomial can be expressed as given by formula (20) by using a 63-degree polynomial g and a 62-degree polynomial h.

$$g + x^{64} h = g + (x^4 + x^3 + x + 1) h \bmod f \tag{20}$$

The product (x+1)a of a given element a and x+1 can be expressed by formula (21).

$$xa + a = xa \oplus a \tag{21}$$

In addition, $x^n a$ raises the degree of each term of a by n and is equivalent to $2^n$-times in integer representation or shifting the bits left by n bits. Therefore, it can be expressed as given by formula (22).

$$(x^4 + x^3 + x + 1)h = (h << 4) \oplus (h << 3) \oplus (h << 1) \oplus h \tag{22}$$

Since h is a 62-degree polynomial, $$(h << 4) \oplus (h << 3)$$

in formula (22) becomes a polynomial of degree 64 or higher, and the degree needs to be reduced again. The part of degree 64 or higher becomes as given by formula (23).

$$x^4 (h_{62} x^{62} + h_{61} x^{61} + h_{60} x^{60}) + x^3 (h_{62} x^{62} + h_{61} x^{61}) = x^{64} ((h >> 60) \oplus (h >> 61)) \tag{23}$$

Since extra bits exceeding 64 bits are discarded in 64-bit integers, formula (24) should be calculated.

$$x^{64}(h \oplus (h \gg 60) \oplus (h \gg 61)) = \tag{24}$$
$$(x^4 + x^3 + x + 1)(h \oplus (h \gg 60) \oplus (h \gg 61)) =$$
$$(x^3 + 1)(x + 1)(h \oplus (h \gg 60) \oplus (h \gg 61))$$

In the multiplication, when the bit count of either one is 61 or less (or more precisely, when the total bit count of both is 125 or less), formula (25) holds true, and consequently reduction can be made more efficient.

$$(h >> 60) \oplus (h >> 61) = 0 \tag{25}$$

Therefore, if reduction is also taken into consideration, multiplying by a 61-bit number having just a single bit set, that is, $2^i$ in a range of $0 \leq i \leq 60$, is fast.

Secret sharing of the present invention generates parity shares by using a Vandermonde matrix. If a vector a is expressed as $a=(a_0, \ldots, a_{k-1} \in GF(x^q))$, the parity share is calculated by formula (26), where $GF(x^q)$ is an extension field generated by an irreducible polynomial f[X] and its degree of field extension is q; x is an element of the irreducible polynomial f[X]; and f[X]=X.

$$\sum_{0 \leq j < k} a_j x^{ij} \tag{26}$$

If the field is a large-size extension field, efficiency can be improved. Let f' be a polynomial excluding the term with the highest degree from the irreducible polynomial f and d be the degree of the term with the highest degree of the polynomial f'. Then, when $(m-1)(k-1) \leq q-d$ is satisfied, the multiplication becomes simpler than usual, as given below.

If i is smaller than q, then $x^i = X^i$. If an input a is as shown in formula (27), the result of polynomial multiplication is given by formula (28).

$$\sum_{j<q} a_j X^j \quad (27)$$

$$aX^i = \left(\sum_{j<q} a_j X^j\right) X^i \quad (28)$$

Since the degree here is q or higher, $f \equiv 0 \Leftrightarrow X^q \equiv -f'$ is used, and the remainder of division by f is obtained. By letting the part of degree lower than q in $aX^i$ be g and the part of degree q or higher divided by $X^q$ be a polynomial h, $aX^i \equiv g - hf'$ is obtained. In the multiplication of the extension field, this type of degree reduction is usually repeated until the degree of g−hf' becomes q−1. Here, if i is q−d or lower, the degree of $aX^i$ is $q-1+q-d \equiv 2q-d-1$ at most, and the degree of h is q−d−1 at most. Since f' is a d-degree polynomial, the degree of hf' is q−1 at most, and just a single degree reduction would be enough.

In step S14, the following configuration enables more efficient calculation. It is supposed here that $(m-1)(k-1) \leq q-d$ holds true.

In step S14, the share generation unit 14 of the distributing apparatus calculates a value $c_i$ for $i \in \{0, \ldots, m-1\}$ as given by formula (29).

$$c_i = \sum_{0 \leq j < k-1} r_j x^{ij} + s x^{i(k-1)} \quad (29)$$

A polynomial $h_i$ obtained by dividing the part of degree q or higher of the value $c_i$ by $X^q$ and a polynomial $g_i$ which is a part of degree lower than q of the value $c_i$ are generated. By using these polynomial $h_i$ and polynomial $g_i$, $g_i - h_i f'$ is calculated, and the value $c_i$ is updated with the calculation result. The values $c_0$ to $c_{m-1}$ obtained in that way are set as elements $b_{k-1}$ to $b_{n-1}$ of the vector b.

Since $(m-1)(k-1) \leq q-d$ holds true for the distribution method of the second embodiment, a single reduction is enough for all field multiplications. Therefore, the volume of processing for multiplications including reduction is reduced.

Third Embodiment

In the second embodiment, $(m-1)(k-1) \leq q-d$ needs to be satisfied. In a third embodiment, extension is made to reduce the volume of processing for the field multiplications even when $(m-1)(k-1) \leq q-d$ is not satisfied.

In step S14, the share generation unit 14 of the distributing apparatus sets $a'_j = a_j$ for $j \in \{0, \ldots, k-1\}$ and $d_j = 0$. Then, a value $c_i$ is calculated as given by formula (30) for $i \in \{0, \ldots, m-1\}$.

$$c_i = \sum_{0 \leq j < k} a'_j x^{ij-d_j} \quad (30)$$

A polynomial $h_i$ obtained by dividing the part of degree q or higher of the value $c_i$ by $X^q$ and a polynomial $g_i$ which is a part of degree lower than q of the value $c_i$ are generated. By using these polynomial $h_i$ and polynomial $g_i$, $g_i - h_i f'$ is calculated, and then the value $c_i$ is updated. If $i \neq m-1$ and $(i+1)j - d \geq q - d$ for $i \in \{0, \ldots, m-1\}$ and $j \in \{0, \ldots, k-1\}$, the values are updated as $a'_j := a'_j x^{\alpha}$ and $d_j := d_j + \alpha$, where $\alpha$ is a positive integer smaller than or equal to q−d. The values $c_0$ to $c_{m-1}$ obtained in that way are set as elements $b_{k-1}$ to $b_{n-1}$ of the vector b.

The reduction in the volume of processing in the third embodiment is not so large as that in the second embodiment, but the system is sufficiently useful for enhancing the speed if an appropriate a is specified.

The error-correcting code allows the input to be used directly as a share, but secret sharing does not allow the input to be used directly as a share. However, secret sharing allows a random number to be used directly as a share. A strong point of the present invention is that mathematical operations are reduced while security is maintained, in consideration of the points described here.

The present invention is not limited to the above described embodiments, and it is needless to say that appropriate changes can be made to the above embodiments without departing from the scope of the present invention. Each type of processing described in the embodiments may be executed not only time sequentially according to the order of description but also in parallel or individually when necessary or according to the processing capabilities of the apparatuses that execute the processing.

Program and Recording Medium

When various types of processing functions in each apparatus, described in the embodiments, are implemented by a computer, the processing details of the functions that should be provided by each apparatus are described in a program. When the program is executed by a computer, the processing functions in each apparatus are implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

This program is distributed by selling, transferring, or lending a portable recording medium, such as a DVD or a CD-ROM, with the program recorded on it, for example. The program may also be distributed by storing the program in a storage of a server computer and transferring the program from the server computer to another computer through the network.

A computer that executes this type of program first stores the program recorded on the portable recording medium or the program transferred from the server computer in its storage, for example. Then, the computer reads the program stored in its storage and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, the apparatuses are implemented by executing the predetermined programs on the computer, but at least a part of the processing details may be implemented by hardware.

What is claimed is:

1. A secret sharing method in which x is an element X of an irreducible polynomial f[X] that generates an extension field $GF(x^q)$, n and k are integers equal to or larger than 2 and satisfy n≥2k−1, $p_0$ to $p_{k-1}$ are different integers equal to or larger than 0 and smaller than n, and A is an n-by-k matrix defined by a formula given below:

$$A_{ij} = \begin{cases} 1 & \text{if } i = j \text{ and } i < k-1 \\ 0 & \text{if } i \neq j \text{ and } i < k-1 \\ x^{(i-k-1)j} & \text{if } i \geq k-1 \end{cases}$$

where $i \in \{0, \ldots, n-1\}, j \in \{0, \ldots, k-1\}$, the secret sharing method comprising:
generating, by circuitry of a distributing apparatus, random numbers $r_0, \ldots, r_{k-2} \in GF(x^q)$;
generates, by the circuitry of the distributing apparatus, shares $b_0$ to $b_{n-1}$ by calculating a product of a vector $a=(r_0, \ldots, r_{k-2}, s)$, having the random numbers $r_0$ to $r_{k-2}$ and plaintext $s \in GF(x^q)$ as its elements, and the matrix A; the generating of the shares $b_0$ to $b_{n-1}$ requiring fewer than (k−1)n multiplications;
distributing, by the circuitry of the distributing apparatus, the shares $b_0$ to $b_{n-1}$ to a plurality of devices;
receiving, by circuitry of a restoring apparatus and from the plurality of devices, k shares $b_{p0}$ to $b_{pk-1}$ of the shares $b_0$ to $b_{n-1}$ distributed by the distributing apparatus to the plurality of devices;
generating, by the circuitry of the restoring apparatus, a vector $b'=(b_{p0}, \ldots, b_{pk-1})$ having, as its elements, the k shares $b_{p0}, \ldots, b_{pk-1}$ of the shares $b_0$ to $b_{n-1}$;
generating, by the circuitry of the restoring apparatus, an inverse matrix $A'^{-1}$ of a k-degree square matrix having the $p_0$-th to $p_{k-1}$-th rows of the matrix A; and
restoring, by the circuitry of the restoring apparatus, the plaintext s by multiplying the k-th row of the inverse matrix $A'^{-1}$ and the vector b'.

2. The secret sharing method according to claim 1, wherein q is the degree of field extension of the extension field $GF(x^q)$, d is the degree of a term of the highest degree of a polynomial f' obtained by excluding a term of the highest degree from the irreducible polynomial f[X], m=n−k, and (m−1)(k−1)≤q−d,
the secret sharing method comprising:
calculating, by the circuitry of the distributing apparatus, a value $c_i$ for $i \in \{0, \ldots, m-1\}$ as expressed by a formula given below:

$$c_i = \sum_{0 \leq j < k-1} r_j x^{ij} + sx^{i(k-1)}$$

updating the value $c_i$ by calculating $g_i - h_i f'$ by using a polynomial $h_i$ obtained by dividing a part of degree q or higher of the value $c_i$ by $X^q$ and a polynomial $g_i$ which is a part of degree below q of the value $c_i$, and setting the values $c_0$ to $c_{m-1}$ as the shares $b_0$ to $b_{n-1}$.

3. The secret sharing method according to claim 1, wherein q is the degree of field extension of the extension field $GF(x^q)$, d is the degree of a term of the highest degree of a polynomial f 40 obtained by excluding a term of the highest degree from the irreducible polynomial f[X], and m=n −k,
the secret sharing method comprising:
setting $a'_j = a_j$ and $d_j = 0$ for $j \in \{0, \ldots, k-1\}$, calculating a value $c_i$ for $i \in \{0, \ldots, m-1\}$ as expressed by a formula given below, $$c_i = \sum_{0 \leq j < k} a'_j x^{ij-d_j}$$

calculating $g_i - h_i f'$ by using a polynomial $h_i$ obtained by dividing a part of degree q or higher of the value $c_i$ by $X^q$ and a polynomial $g_i$ which is a part of degree below q of the value $c_i$, the value $c_i$ is updated, if i≠m−1 and (i+1)j−d≥q−d for $i \in \{0, \ldots, m-1\}$ and $j \in \{0, \ldots, k-1\}$, updating $a'_j := a'_j X^\alpha$ and $d_j := d_j + \alpha$, and setting the values $c_0$ to $c_{m-1}$, as the shares $b_0$ to $b_{n-1}$.

4. The secret sharing method according to claim 1, wherein a number of multiplications performed in the generating of the shares $b_0$ to $b_{n-1}$ is (k−1)(n−k+1).

5. A secret sharing system comprising a distributing apparatus and a restoring apparatus;
wherein x is an element X of an irreducible polynomial f[X] that generates an extension field $GF(x^q)$, n and k are integers equal to or larger than 2 and satisfy n≥2k−1, $p_0$ to $p_{k-1}$, are different integers equal to or larger than 0 and smaller than n, and A is an n-by-k matrix defined by a formula given below:

$$A_{ij} = \begin{cases} 1 & \text{if } i = j \text{ and } i < k-1 \\ 0 & \text{if } i \neq j \text{ and } i < k-1 \\ x^{(i-k-1)j} & \text{if } i \geq k-1 \end{cases}$$

where $i \in \{0, \ldots, n-1\}, j \in \{0, \ldots, k-1\}$, the distributing apparatus comprising:
circuitry configured to:
generate random numbers $r_0, \ldots, r_{k-2} \in GF(x^q)$,
generate shares $b_o$ to $b_{n-1}$ by calculating a product of a vector $a=(r_0, \ldots, r_{k-2}, s)$, having the random numbers $r_0$ to $r_{k-2}$ and plaintext $s \in GF(x^q)$ as its elements, and the matrix A, the generating of the shares $b_0$ to $b_{n-1}$ requiring fewer than (k−1)n multiplications, and
distribute the shares $b_0$ to $b_{n-1}$ to a plurality of devices;
the restoring apparatus comprising:
another circuitry configured to:
receive, from the plurality of devices, $b_{p0}$ to $b_{pk-1}$ of the shares $b_0$ to $b_{n-1}$ distributed by the distributing apparatus to the plurality of devices,
generate a vector $b'=(b_{p0}, \ldots b_{pk-1})$ having, as its elements, k shares $b_{p0}$ to $b_{pk-1}$ selected from the shares $b_0$ to $b_{n-1}$,
generate an inverse matrix $A'^{-1}$ of a k-degree square matrix having the $p_0$-th to $p_{k-1}$-th rows of the matrix A, and restore the plaintext s by multiplying the k-th row of the inverse matrix $A'^{-1}$ and the vector b'.

6. A distributing apparatus in which x is an element X of an irreducible polynomial f[X] that generates an extension field $GF(x^q)$, n and k are integers equal to or larger than 2 and satisfy n≥2k−1, $p_0$ to $p_{k-1}$ are different integers equal to or larger than 0 and smaller than n; and A is an n−by−k matrix defined by a formula given below:

$$A_{ij} = \begin{cases} 1 & \text{if } i = j \text{ and } i < k-1 \\ 0 & \text{if } i \neq j \text{ and } i < k-1 \\ x^{(i-k-1)j} & \text{if } i \geq k-1 \end{cases}$$

where i∈{0, . . . , n−1}, j∈{0, . . . ,k −1}, the distributing apparatus comprising:
circuitry configured to:
generate random numbers $r_0, \ldots, r_{k-2} \in GF(x^q)$;
generate shares $b_0$ to $b_{n-1}$ by calculating a product of a vector $a=(r_0, \ldots, r_{k-2}, s)$, having the random numbers $r_0$ to $r_{k-2}$ and plaintext $s \in GF(x^q)$ as its elements, and the matrix A, the generating of the shares $b_0$ to $b_{n-1}$ requiring fewer than (k−1)n multiplications; and
distribute the shares $b_0$ to $b_{n-1}$ to a plurality of devices.

7. A non-transitory computer readable medium including computer executable instructions that make a distributing apparatus, wherein x is an element X of an irreducible polynomial f[X] that generates an extension field $GF(x^q)$, n and k are integers equal to or larger than 2 and satisfy n≥2k −1, $p_0$ to $p_{k-1}$ are different integers equal to or larger than 0 and smaller than n; and A is an n−by−k matrix defined by a formula given below:

$$A_{ij} = \begin{cases} 1 & \text{if } i = j \text{ and } i < k-1 \\ 0 & \text{if } i \neq j \text{ and } i < k-1 \\ x^{(i-k-1)j} & \text{if } i \geq k-1 \end{cases}$$

where i∈{0, . . . , n−1}, j∈{0, . . . ,k −1}, perform a method comprising:
generating random numbers $r_0, \ldots, r_{k-2} \in GF(x^q)$; and
generating shares $b_0$ to $b_{n-1}$ by calculating a product of a vector $a=(r_0, \ldots, r_{k-2}, s)$, having the random numbers $r_0$ to $r_{k-2}$ and plaintext $s \in GF(x^q)$ as its elements, and the matrix A, the generating of the shares $b_0$ to $b_{n-1}$ requiring fewer than (k−1)n multiplications; and
distributing the shares $b_0$ to $b_{n-1}$ to a plurality of devices.

* * * * *